US008560477B1

(12) United States Patent  (10) Patent No.: US 8,560,477 B1
Petrov et al.  (45) Date of Patent: Oct. 15, 2013

(54) GRAPH-BASED SEMI-SUPERVISED LEARNING OF STRUCTURED TAGGING MODELS

(75) Inventors: Slav Petrov, New York, NY (US); Amarnag Subramanya, Sunnyvale, CA (US); Fernando Pereira, Menlo Park, CA (US); Dipanjan Das, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 212 days.

(21) Appl. No.: 12/901,356

(22) Filed: Oct. 8, 2010

(51) Int. Cl.
*G06F 17/00* (2006.01)
*G06N 5/02* (2006.01)

(52) U.S. Cl.
USPC .......................................................... 706/46

(58) Field of Classification Search
None
See application file for complete search history.

(56) References Cited

U.S. PATENT DOCUMENTS

| | | | | |
|---|---|---|---|---|
| 6,278,967 | B1* | 8/2001 | Akers et al. | 704/2 |
| 7,809,548 | B2* | 10/2010 | Mihalcea et al. | 704/1 |
| 8,145,677 | B2* | 3/2012 | Al-Shameri | 707/802 |
| 2006/0190492 | A1* | 8/2006 | Karl et al. | 707/104.1 |
| 2008/0154577 | A1* | 6/2008 | Kim et al. | 704/2 |
| 2008/0177545 | A1* | 7/2008 | Li et al. | 704/255 |
| 2009/0271177 | A1* | 10/2009 | Menezes et al. | 704/2 |
| 2011/0093459 | A1* | 4/2011 | Dong et al. | 707/725 |

OTHER PUBLICATIONS

Xiaojin Zhu. 2005. Semi-Supervised Learning with Graphs. Ph.D. Dissertation. Carnegie Mellon Univ., Pittsburgh, PA, USA. AAI3179046. Published on the ACM Digital Library.*

Klinger Roman and Tomanek Katrin. Classical Probabilistic Models and Conditional Random Fields. Algorithm Engineering Report. TR07-2-013 Dec. 2007.Technische Universitat Dortmund.*
Huang, F. and Yates, A., "Distributional representations for handling sparsity in supervised sequence-labeling," In ACL-IJCNLP '09: Proceedings of the Joint Conference of the 47th Annual Meeting of the ACL and the 4th International Joint Conference on Natural Language Processing of the AFNLP: vol. 1, Association for Computational Linguistics, 2009, 9 pages.
Joachims, T., "Transductive inference for text classification using support vector machines," In Proc. of the International Conference on Machine Learning (ICML), 1999, 12 pages.
Joachims, T., "Transductive learning via spectral graph partitioning," In Proc. of the International Conference on Machine Learning (ICML), 2003, 8 pages.
Judge, J., et al.,"Question Bank: creating a corpus of parse-annotated questions," In Proceedings of the 21st International Conference on Computational Linguistics and 44th Annual Meeting of the Association for Computational Linguistics, pp. 497-504, 2006, 8 pages.

(Continued)

*Primary Examiner* — Kakali Chaki
*Assistant Examiner* — Mario Riojas Ramirez
(74) *Attorney, Agent, or Firm* — Remarck Law Group PLC

(57) ABSTRACT

Methods, systems, and apparatus, including computer programs encoded on a computer storage medium, for graph-based semi-supervised learning of structured tagging models. In one aspect, a method includes creating a graph having a plurality of unique vertices in which vertices in a first set of vertices represent n-grams that are each associated with a respective part-of-speech and that were derived from labeled source domain text, and in which vertices in a different second set of vertices represent n-grams that are not associated with a part-of-speech and that were derived from unlabeled target domain text. A respective measure of similarity is calculated between the vertices in each of the pairs based at least partially on a distance between the respective features of the pair used to weight a graph edge between the pair.

21 Claims, 6 Drawing Sheets

(56) References Cited

OTHER PUBLICATIONS

Lafferty, J., et al., "Conditional random fields: probabilistic models for segmenting and labeling sequence data," In Proc. of the International Conference on Machine Learning (ICML), 2001, 8 pages.

Lawrence, N.D. and Jordan, M.I., "Semi-supervised learning via Gaussian processes," In L.K. Saul, Y. Weiss, and Bottou L, editors, Advances in Neural Information Processing Systems 17, pp. 753-760, Cambridge, MA, 2005, The MIT Press, 10 pages.

Scudder, H.J., "Probability of error of some adaptive pattern-recognition machines," IEEE Transactions on Information Theory, 11, 1965, 9 pages.

Seeger, M., "Learning with labeled and unlabeled data," Technical report, University of Edinburgh, U.K., 2000, 62 pages.

Shen, L., et al., "Guided learning for bidirectional sequence classification," In ACL, 2007, 8 pages.

Sindhwani, V., et al., "Beyond the point cloud: from transductive to semi-supervised learning," In Proc. of the International Conference on Machine Learning (ICML), 2005, 8 pages.

Subramanya, A. and Bilmes, J.A., "En-tropic graph regularization in non-parametric semi-supervised classification," In Neural Information Processing Society (NIPS), Vancouver, Canada, Dec. 2009, 10 pages.

Toutanova, K., et al., Feature-rich part-of-speech tagging with a cyclic dependency network, In HLT-NAACL, 2003, 8 pages.

Wang, Y., et al., A rate distortion approach for semi-supervised conditional random fields, 2009, 10 pages.

Yarowsky, D., "Unsupervised word sense disambiguation rivaling supervised methods," In Proceedings of the 33rd Annual Meeting of the Association for Computational Linguistics, 1995, 8 pages.

Zhu, X., et al., "Semi-supervised learning using Gaussian fields and harmonic functions," In Proc. of the International Conference on Machine Learning (ICML), 2003, 9 pages.

Xiaojin Zhu, Zoubin Ghahramani, and John Lafferty. 2003. Semi-supervised learning using gaussian fields and harmonic functions. In Proc. of the International Conference on Machine Learning (ICML), 9 pages.

Alexandrescu, A. and Kirchhoff, K., "Graph-based learning for statistical machine translation," In NAACL, 2009, 9 pages.

Altun, Y., et al., "Maximum margin semi-supervised learning for structured variables," In Advances in Neural Information Processing Systems 18, p. 18, 2005, 10 pages.

Belkin, M., et al., "On manifold regularization," In Proc. of the Conference on Artificial Intelligence and Statistics (AISTATS), 2005, 12 pages.

Bengio, Y., et al., "Semi-supervised learning," chapter Label Propagation and Quadratic Criterion, MIT Press, 2007, 26 pages.

Blitzer, J. and Zhu, J., "ACL 2008 tutorial on semi-supervised learning," 2008, 98 pages.

Blitzer, J., et al., "Domain adaptation with structural correspondence learning," In EMNLP, 2006, 9 pages.

Blum, A. and Mitchell, T., "Combining labeled and unlabeled data with co-training," In COLT: Proceedings of the Workshop on Computational Learning Theory, 1998, 9 pages.

Brefeld, U. and Scheffer, T., "Semi-supervised learning for structured output variables," In ICML06, 23rd International Conference on Machine Learning, 2006, 8 pages.

Collobert, R., et al., "Large scale transductive SVMs," Journal of Machine Learning Research, 2006, 26 pages.

Corduneanu, A. and Jaakkola, T., "On information regularization," In Uncertainty in Artificial Intelligence, 2003, 8 pages.

Daume III, H., "Frustratingly easy domain adaptation," In Proceedings of the 45th Annual Meeting of the Association of Computational Linguistics, pp. 256-263, Prague, Czech Republic, June, Association for Computational Linguistics, 2007, 8 pages.

Grandvalet, Y. and Bengio, Y, "Semi-supervised learning by entropy minimization," In CAP, 2005, 16 pages.

Gupta, R., "Generalized collective inference with symmetric clique potentials," CoRR, abs/0907.0589, 2005.

Haffari, G.R. and Sarkar, A., "Analysis of semi-supervised learning with the Yarowsky algorithm," In UAI, 2007, 8 pages.

\* cited by examiner

| Description | Feature |
|---|---|
| Trigram + Context | $x_1\ x_2\ x_3\ x_4\ x_5$ |
| Trigram | $x_2\ x_3\ x_4$ |
| Left Context | $x_1\ x_2$ |
| Right Context | $x_4\ x_5$ |
| Center Word | $x_2$ |
| Trigram − Center Word | $x_2\ x_4$ |
| Left Word + Right Context | $x_2\ x_4\ x_5$ |
| Left Context + Right Word | $x_1\ x_2\ x_4$ |
| Suffix | HasSuffix($x_3$) |

Table 1: Features we extract given a sequence of words "$x_1\ x_2\ x_3\ x_4\ x_5$" where the trigram is "$x_2\ x_3\ x_4$"

FIG. 1A

|  | Questions | | Bio | |
|---|---|---|---|---|
|  | Dev | Eval | Dev | Eval |
| Supervised CRF | 84.8 | 83.8 | 86.5 | 86.2 |
| Self-trained CRF | 85.4 | 84.0 | 87.5 | 87.1 |
| Semi-supervised CRF | 87.6 | 86.8 | 87.5 | 87.6 |

Table 2: Domain Adaptation Experiments. POS Tagging Accuracies (in %).

FIG. 1B

|  | Questions | Bio |
|---|---|---|
| % of unlabeled trigrams not connected to any labeled trigrams | 12.4 | 46.8 |
| average path length between an unlabeled trigram and its nearest labeled trigram | 9.4 | 22.4 |

Table 3: Analysis of the Graphs constructed for the two datasets discussed in Section 6. By unlabeled trigrams we mean trigrams that occur in the target domain data while labeled trigrams are those that occur in the source domain data (WSJ).

302 Create a graph having vertices representing *n*-grams in which some of the *n*-grams are associated with a respective part of speech

304 Determine features of each vertex in pairs of graph vertices based on features of words that surround each vertex's *n*-gram in labeled source domain text or unlabeled target domain text

306 Calculate an edge weight between each of the pairs of graph vertices based on a measure of similarity between the pair

FIG. 3

GRAPH-BASED SEMI-SUPERVISED LEARNING OF STRUCTURED TAGGING MODELS

BACKGROUND

This specification relates to digital data processing and, in particular, part-of-speech tagging.

Semi-supervised learning (SSL) is the use of small amounts of labeled data with relatively large amounts of unlabeled data to train predictors. In some cases, the labeled data is sufficient to provide reasonable accuracy on in-domain data, but performance on even closely related out-of-domain data may lag far behind. Annotating training data for all sub-domains of a varied domain such as all of Web text can be impractical, giving impetus to the development of SSL techniques that can learn from unlabeled data to perform well across domains. An early SSL algorithm is self-training, where one makes use of a previously trained model to annotate unlabeled data which is then used to re-train the model. While self-training is widely used and can yield good results in some applications, it has no theoretical guarantees except under certain stringent conditions.

Other SSL methods include co-training, transductive support vector machines (TSVM), and graph-based algorithms. A majority of SSL algorithms are computationally expensive; for example, solving a TSVM exactly is intractable. Thus there is a conflict between wanting to use SSL with large unlabeled data sets for best accuracy, and being unable to do so because of computational complexity. Graph-based SSL algorithms are an important subclass of SSL techniques that have received attention in the recent past as they can outperform other approaches and also scale easily to large problems. Here one assumes that the data (both labeled and unlabeled) is represented by vertices in a graph. Graph edges link vertices that are likely to have the same label. Edge weights govern how strongly the labels of the nodes linked by the edge should agree.

SUMMARY

Other embodiments of this aspect include corresponding systems, apparatus, and computer programs, configured to perform the actions of the methods, encoded on computer storage devices.

In general, one innovative aspect of the subject matter described in this specification can be embodied in methods that include the actions of creating a graph having a plurality of unique vertices in which vertices in a first set of vertices represent n-grams that are each associated with a respective part-of-speech (POS) and that were derived from labeled source domain text, and in which vertices in a different second set of vertices represent n-grams that are not associated with a POS and that were derived from unlabeled target domain text; for different pairs of vertices in the plurality of vertices in which at least one vertex in the pair is in the second set of vertices, and at least one vertex in the pair is a k-nearest neighbor of the other vertex in the pair where k is greater than 1, determining respective features of each vertex in the pair based at least partially on features of words that surround occurrences of the particular vertex's n-gram in the source or target domain text; and calculating a respective measure of similarity between the vertices in each of the pairs based at least partially on a distance between the respective features of the pair, and using the measure of similarity to weight a graph edge between the pair. Other embodiments of this aspect include corresponding systems, apparatus, and computer programs, configured to perform the actions of the methods, encoded on computer storage devices.

These and other embodiments can each optionally include one or more of the following features. N-grams can be trigrams. The source and target domain text can comprise sentences in a natural language of the source domain. The respective features of the pair can be represented by point-wise mutual information vectors. The respective measure of similarity can be a cosine distance between the vectors. The respective features can include left and right word contexts. The similarity graph can be used to decode target domain text. A POS associated with a first vertex in the graph can be propagated to a second vertex in the graph based on a weight of an edge between the first vertex and the second vertex.

In general, another innovative aspect of the subject matter described in this specification can be embodied in methods that include the actions of creating a graph having a plurality of unique vertices in which the vertices represent n-grams that were derived from unlabeled source domain text in a first natural language; for different pairs of vertices in the plurality of vertices in which at least one vertex in the pair is a k-nearest neighbor of the other vertex in the pair where k is greater than 1, determining respective features of each vertex in the pair based at least partially on features of words that surround occurrences of the particular vertex's n-gram in the source domain text; calculating a respective measure of similarity between the vertices in each of the pairs based at least partially on a distance between the respective features of the pair, and using the measure of similarity to weight a graph edge between the pair; assigning a respective part-of-speech (POS) to one or more vertices in a plurality of the graph vertices in which the respective POS corresponds to a POS of a respective n-gram in a target domain text that is in a different second natural language, in which assigning the respective part-of-speech to the one or more vertices comprises determining that the respective n-gram in the target domain text is similar to the n-gram represented by the particular vertex based on co-occurrences of both n-grams in one or more natural languages; and propagating an assigned POS associated with a first vertex in the graph to a second vertex in the graph based on a weight of an edge between the first vertex and the second vertex. Other embodiments of this aspect include corresponding systems, apparatus, and computer programs, configured to perform the actions of the methods, encoded on computer storage devices.

These and other embodiments can each optionally include one or more of the following features. The second natural language can be English. The n-grams can be trigrams. The respective features of the pair can be represented by point-wise mutual information vectors. The respective measure of similarity can be a cosine distance between the vectors. The respective features can include left and right word contexts. The graph can be used decode unlabeled data from the source domain text.

In general, another innovative aspect of the subject matter described in this specification can be embodied in methods that include the actions of 16. A computer-implemented method, comprising: training a semi-supervised statistical model on unlabeled text from a target domain, in which parameters of the semi-supervised statistical model are initialized based on those of a second statistical model trained on labeled text from a source domain; determining one or more respective part-of-speech (POS) probabilities for each of a plurality of unique n-grams in the unlabeled target domain text using the trained semi-supervised statistical model; smoothing the one or more determined POS probabilities using a similarity graph constructed over the labeled source domain text; and labeling one or more of the n-grams with a respective POS based on a combination of the particular n-gram's respective determined probabilities and smoothed probabilities. Other embodiments of this aspect include corresponding systems, apparatus, and computer programs, configured to perform the actions of the methods, encoded on computer storage devices.

These and other embodiments can each optionally include one or more of the following features. A third statistical model can be trained based on the labeled n-grams. The semi-supervised, second and third statistical models can be conditional random fields. Smoothing the one or more determined POS probabilities for a respective n-gram can be based on an edge weight between a first vertex in the similarity graph that represents the respective n-gram and a different, second vertex in the similarity graph that represents a different n-gram that is associated with a POS. An n-gram can be a trigram. The source domain can be English language newswire and the target domain is biomedical literature. The source domain can be English language newswire and the target domain comprises user queries. The source domain can be English language newswire and the target domain is newswire from a different natural language.

Aspects described herein provide a simple, scalable algorithm for training structured prediction models in a semi-supervised manner. One aspect is based on using a nearest-neighbor graph constructed over trigram types as a regularizer. Implementations include a scalable algorithm for semi-supervised training of conditional random fields (CRF) and its application to part of speech (POS) tagging. The algorithm uses a similarity graph to encourage similar n-grams to have similar POS tags. It is assumed that text labeled with POS tags is available for the source domain. However we are interested in building a POS tagger for the target domain, for which no labeled data is available. In practice the source and target domains can be different genres of text from one language (e.g., newswire and poetry) or two different languages (e.g., English and French). The graph is used during training to relate the two domains to each other. By smoothing the state posteriors on the target domain, it is possible to learn a more accurate target domain model.

Particular implementations of the subject matter described in this specification can be implemented so as to realize one or more of the following advantages. Particular implementations can be inductive. In a first use case, the similarity graph is used to relate different genres of the same language to each other. Ambiguous words (e.g., 'book' can be a verb or a noun) are used differently in different genres, and it would be tedious, if not impossible to collect labeled data for all genres. The technique makes it possible to learn different models for each genre, without having human annotated data from each genre.

In a second use case, the similarity graph is used to relate similar n-grams from two different natural languages to each other. In this case, the similarity graph can be used to propagate knowledge about the part-of-speech distribution in one language to the other language. By propagating information from one language to another, the technique makes it possible to obtain very accurate POS taggers for the target language, without having any labeled data from the target language.

Techniques described herein are able to scale to very large problems and yield improved target domain accuracy. The techniques are scalable because they include training using efficient standard building blocks for CRF inference and learning, and for graph label propagation. Because graph regularizer computations are used only during training, at test time standard CRF inference can be used.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A-C present tables that describe extracted features, domain adaptation experiments, and analysis of graphs, respectively.

FIG. 3 presents a flow chart of an example technique for constructing a similarity graph to be used as a graph regularizer.

Like reference numbers and designations in the various drawings indicate like elements.

DETAILED DESCRIPTION

Figure 2:
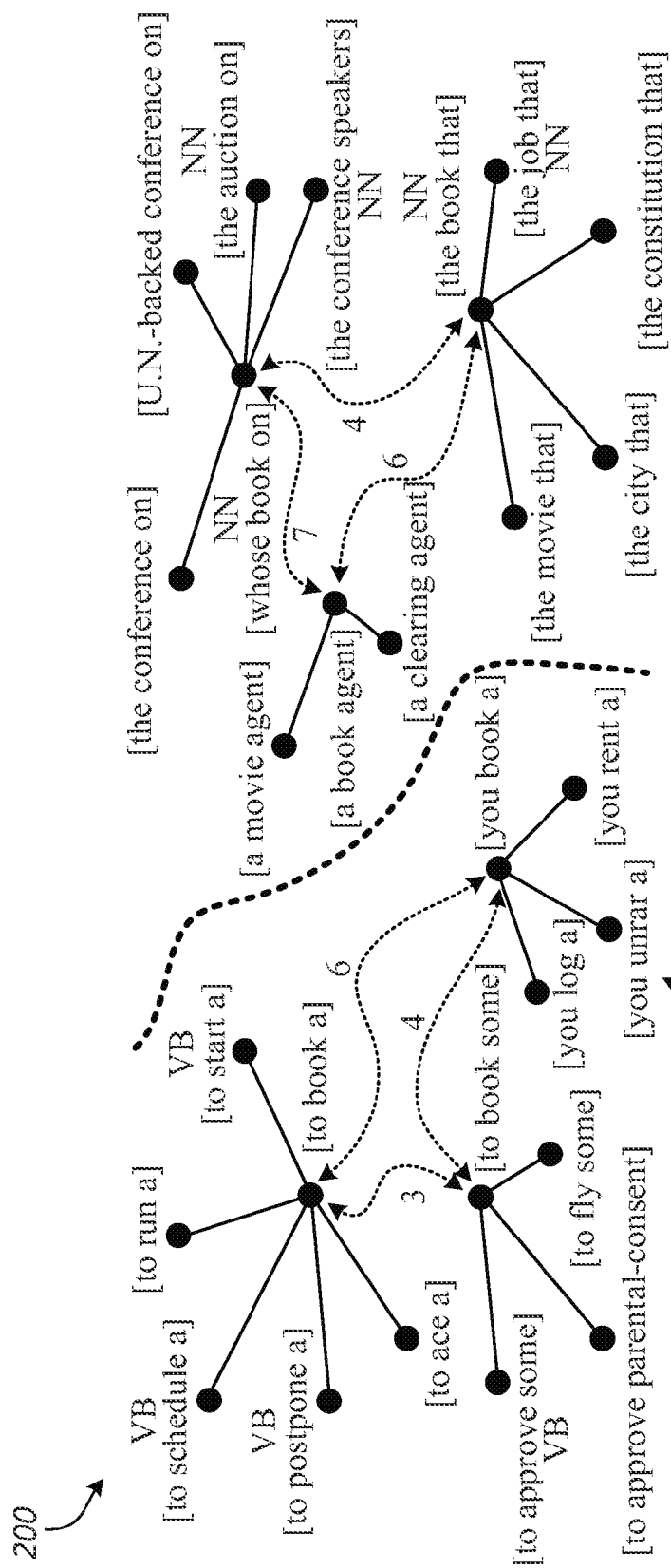
FIG. 2 shows an excerpt from an example similarity graph.

In various implementations, a CRF is trained on the source domain labeled data, and then the CRF is used to decode unlabeled data from the target domain. The state posteriors on the target domain are then smoothed using a graph regularizer. Best state sequences for the unlabeled target are then be created by Viterbi decoding with the smoothed state posteriors, and this automatic target domain annotation is combined with the labeled source domain data to retrain the CRF.

Supervised CRF

Given a sample of labeled source domain examples $D_l = \{(x_i, y_i)\}_{i=1}^{l}$, and unlabeled target domain samples $D_u = \{x_i\}_{i=l+1}^{l+u}$, the sequence of words in sentence i is $x_i = x_i^{(1)} x_i^{(2)} \ldots x_i^{(N_i)}$ and the correspond POS sequence is $y_i = y_i^{(1)} y_i^{(2)} \ldots y_i^{(N_i)}$, with $y_i^{(j)} \in Y$ where Y is the set of POS tags.

The goal is to learn a CRF of the form $$p(y_i | x_i : \Lambda) \propto \exp\left(\sum_{j=1}^{N_i} \sum_{k=1}^{K} \lambda_k f_k(y_i^{(j-1)}, y_i^{(j)}, x_{i,j})\right)$$

for the target domain. In the above, $\Lambda = \{\lambda_1, \ldots, \lambda_K\} \in \mathfrak{R}^K$, $f_k(y_i^{(j-1)}, y_i^{(j)}, x_i, j)$ is the kth feature function applied to two consecutive CRF states and some window of the input sequence, and $\lambda_k$ is the weight of that feature. These features are described further below. Given labeled data $D_l$, the optimal feature weights can be given by:

$$\Lambda^* = \underset{\Lambda \in \mathbb{R}^K}{\operatorname{argmin}} \left[ -\sum_{i=1}^{l} \log p(y_i | x_i : \Lambda) + \gamma \|\Lambda\|^2 \right]. \quad (1)$$

Here $\|\Lambda\|^2$ is the squared l2-norm and acts as the regularizer, and $\gamma$ is a trade-off parameter whose setting is discussed below. Unlabeled data $D_u$ from the target domain can be used for training the CRF. First described is how to construct a similarity graph over the unlabeled data that will be used in varies implementations as a graph regularizer.

Graph Construction

Graph construction is an important step in graph-based SSL. A standard approach for unstructured problems is to construct a graph whose vertices are labeled and unlabeled examples, and whose weighted edges encode the degree to which the examples they link want to have the same label. See, e.g., Xiaojin Zhu, Zoubin Ghahramani, and John Lafferty, SEMI-SUPERVISED LEARNING USING GAUSSIAN FIELDS AND HARMONIC FUNCTIONS, Proceedings of the International Conference on Machine Learning (2003), which is incorporated by reference in its entirety. One graph construction choice is what measure of example similarity to use for the weighted edges between examples. However, in structured problems the situation can be more complicated. Consider the case of sequence tagging. While there may be an appropriate sequence similarity to construct the graph, such as edit distance or a string kernel, it may not be clear how to use whole sequence similarity to constrain whole tag sequences assigned to linked examples in the learning algorithm. Altun et al. had the insight of undertaking the graph construction not for complete structured examples but instead for the parts of structured examples (also known as factors in graphical model terminology), which encode the local dependencies between input data and output labels in the structured problem. See Y. Altun, D. McAllester, and M. Belkin, MAXIMUM MARGIN SEMI-SUPERVISED LEARNING FOR STRUCTURED VARIABLES, Advances in Neural Information Processing Systems 18, page 18 (2005), which is incorporated by reference in its entirety. A variant of their approach is adopted in various implementations.

In various implementations, the set V of graph vertices consists of all the word n-grams (types) that have occurrences (tokens) in training sentences (labeled and unlabeled; n-grams padded with appropriate dummy symbols at sentence begin and end). The graph is partitioned such that $V=V_l \cup V_u$, where $V_l$ corresponds to n-grams that occur at least once in the labeled data, and $V_u$ corresponds to n-grams that occur only in the unlabeled data.

Given a symmetric similarity measure between types to be defined below, types u and v can be linked with an edge of weight $w_{uv}$ when $w_{uv}>0$:

$$w_{uv} = \begin{cases} sim(u, v) & \text{if } v \in K(u) \text{ or } u \in K(v) \\ 0 & \text{otherwise} \end{cases} \quad (2)$$

where K(u) is the set of k-nearest neighbors of u according to the given similarity. In some implementations, n=3 and k=5.

To define the similarity function, for each token of a given type in the labeled and unlabeled data, a set of context features are extracted. For example, for the token $x_2 x_3 x_4$ occurring in the sequence $x_1 x_2 x_3 x_4 x_5$, features are extracted that capture the left ($x_1 x_2$) and right contexts ($x_4 x_5$). Additionally, features can be extracted based on eight discriminating suffixes of the word in the middle. In some implementations, the features illustrated in TABLE 1 (FIG. 1A) can be used. For each type, a vector of point-wise mutual information (PMI) values is computed between the type and each of the features that occur with tokens of that type. Finally, the cosine distance between those PMI vectors is used to determine type similarity. The graph so constructed captures significant local information about the contexts that favor particular tags.

FIG. 2 shows an excerpt from an example similarity graph 200. The figure shows the local neighborhoods of a subset of the vertices with the center word 'book.' To reduce clutter, only closest neighbors and the edges that involve the nodes of interest are illustrated. It is remarkable that the local neighborhoods are coherent, showing very similar syntactic configurations. Furthermore, different vertices that (should) have the same label are close to each other, while the noun (NN) and verb (VB) interpretations are far apart, forming disjoint connected components. The similarity graph can provide information that cannot be expressed directly in a sequence model. In particular, it may not be possible in a CRF to directly enforce that similar trigrams appearing in different sentences should have similar POS tags. This constraint however is important during (semi-supervised) learning, and is what makes the approaches taken in various implementations different and more effective than self-training.

There are two main benefits from this graph-based approach. First, the graph allows new features to be discovered. Many words occur only in the unlabeled data and a purely supervised CRF may not be able to learn feature weights for those observations. While self-training could be used to learn weights for those features, self-training just tends to reinforce the knowledge that the supervised model already has. The similarity graph on the other hand can link events that occur only in the unlabeled data to similar events in the labeled data. Furthermore, because the graph is built over types rather than tokens, it can enforce that the same interpretation is chosen for similar trigrams occurring in different sentences. For example, the word 'unrar' 202 will most likely not occur in the labeled training data. Seeing it in the neighborhood of words for which we know the POS tag will help us learn the correct POS tag for this otherwise unknown word (see FIG. 2). Second, the graph can be used to propagate adjustments to the weights of known features. Many words occur only a handful of times in labeled data, resulting in poor estimates of their contributions. Even for frequently occurring events, their distribution in the target domain might be different from their distribution in the source domain. While self-training might be able to help adapt to such domain changes, its effectiveness can be limited because the model will always be inherently biased towards the source domain. In contrast, labeled vertices in the similarity graph can help disambiguate ambiguous contexts and correct (some of) the errors of the supervised model.

FIG. 3 presents a flow chart of an example technique 300 for constructing a similarity graph to be used as a graph regularizer. A graph (e.g., similarity graph 200) is created that has vertices in which a first set of vertices represent n-grams that are each associated with a respective POS and that were derived from labeled source domain text, and in which a second set of vertices represent n-grams that are not associated with a POS and that were derived from unlabeled target domain text (302). Then, for different pairs of vertices in the plurality of vertices, respective features of each vertex in the pair are determined based at least partially on features of words that surround occurrences of the particular vertex's n-gram in the source or target domain text (304). In some implementations, at least one vertex in the pair is in the second set of vertices, and at least one vertex in the pair is a k-nearest neighbor of the other vertex in the pair. A respective measure of similarity is then calculated between the vertices in each of the pairs based at least partially on a distance between the respective features of the pair, and used to weight a graph edge between the pair (306).

Monolingual Unsupervised POS Tagging with Bilingual Text and Graph-Based Learning Supervised machine learning approaches have advanced the state-of-the-art on a variety of tasks in natural language processing, resulting in highly accurate systems. Supervised POS taggers for example, can approach the level of inter-annotator agreement. However, supervised methods rely on labeled training data, which is time-consuming and expensive to generate. It is therefore unrealistic to expect labeled data to be available for each task and every language, limiting the applicability of supervised learning. Unsupervised learning approaches appear to be a natural solution to this problem, as they require only un-annotated plain text for training models. Unfortunately, even though unsupervised approaches have received much attention lately, the gap between unsupervised and supervised performance still remains substantial.

To bridge this gap, we consider a practically motivated scenario, in which we desire to leverage existing resources from resource-rich languages when building tools for resource-poor languages. In various implementations, a POS tagger is constructed for a resource-poor language assuming that there exists a POS tagger for a first language (e.g., English) and parallel text between the first language and the resource-poor language. The parallel text can be aligned using a standard word alignment tool, for instance. A bilingual graph is constructed over trigram types for the resource-poor language, where the node labels correspond to the POS tag of the middle word in a trigram, for example. The edge weights in this graph indicate how likely it is that two connected nodes have the same label. A similarity function based on co-occurrence features can be used to compute these edge weights. Additionally, the resource-poor language nodes can be connected to the first language nodes based on high-confidence word-alignments. Since there is a labeled POS tagging corpus for the first language, we can use a supervised first language POS tagger to generate labels for the graph nodes. Label propagation is then used to transfer the labels to graph nodes that represent the resource-poor language.

Figure 4:
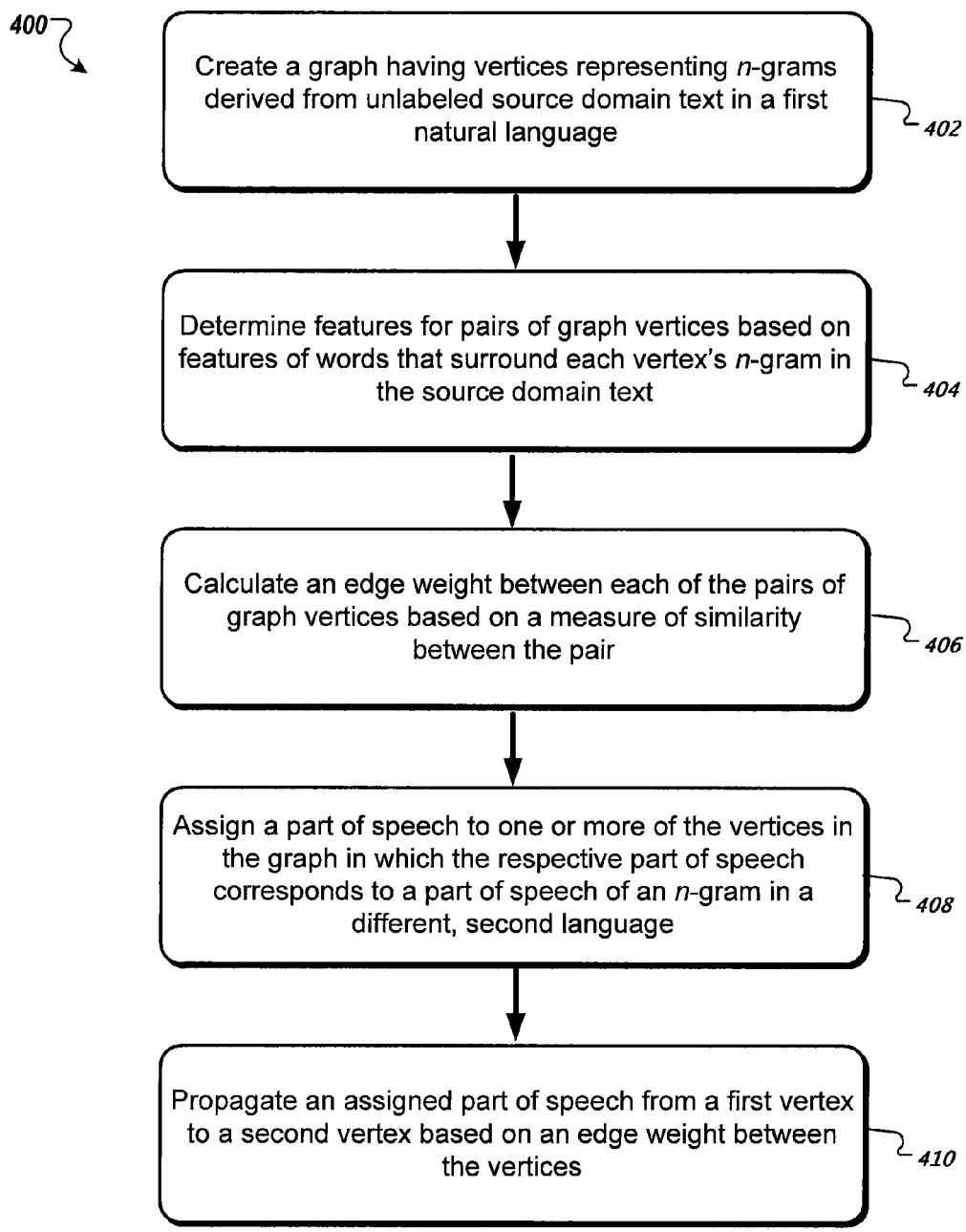
FIG. 4 presents a flow chart of an example technique for building a part-of-speech tagger for a resource poor language.

FIG. 4 presents a flow chart of an example technique 400 for building a POS tagger for a resource poor language. A similarity graph is created that has a plurality of unique vertices in which the vertices represent n-grams that were derived from unlabeled source domain text in a first natural language (402). For different pairs of vertices in the plurality of vertices in which at least one vertex in the pair is a k-nearest neighbor of the other vertex in the pair, respective features of each vertex in the pair are determined based at least partially on features of words that surround occurrences of the particular vertex's n-gram in the source domain text (404). Then, a respective measure of similarity between the vertices in each of the pairs is calculated based at least partially on a distance between the respective features of the pair and used to weight a graph edge between the pair (406). A respective POS is assigned to one or more vertices in a plurality of the graph vertices in which the respective POS corresponds to a POS of a respective n-gram in a target domain text that is in a different second natural language (408). Assigning the respective POS to the one or more vertices comprises determining that the respective n-gram in the target domain text is similar to the n-gram represented by the particular vertex based on co-occurrences of both n-grams in one or more natural languages. An assigned POS associated with a first vertex in the graph is then propagated to a second vertex in the graph based on a weight of an edge between the first vertex and the second vertex (410).

Semi-Supervised CRF

Given unlabeled data $D_u$, there may only be access to the prior p(x). As the CRF is a discriminative model, the lack of label information renders the CRF weights independent of p(x) and thus the CRF may not benefit directly from the unlabeled data. Therefore, semi-supervised approaches to training discriminative models use the unlabeled data to construct a regularizer that is used to guide the learning process. See, e.g., T. Joachims, TRANSDUCTIVE INFERENCE FOR TEXT CLASSI-FICATION USING SUPPORT VECTOR MACHINES, Proceedings of the International Conference on Machine Learning (1999); N. D. Lawrence and M. I. Jordan, SEMI-SUPERVISED LEARNING VIA GAUSSIAN PROCESSES, Advances in Neural Information Processing Systems 17, pages 753-76 (2005), both of which are incorporated by reference in their entireties. In some implementations, the graph is used as a smoothness regularizer to train CRFs in a semi-supervised manner.

Initially, a supervised CRF is trained using the labeled data $D_l$. Let $\Lambda^{(s)}$ (s stands for source domain) represent the optimal value of the parameters obtained during this step. The algorithm is described in the following sections.

Posterior Decoding

Let $\Lambda_n^{(t)}$ (t refers to target domain) represent the estimate of the CRF parameters for the target domain after the nth iteration. Set $\Lambda_0^{(t)} = \Lambda^{(s)}$, the source domain CRF parameters. The marginal probabilities $p(y_i^{(j)}|x_i, \Lambda_n^{(t)}) \forall j \in N_i, i \in D_l$ are computed over POS tags for every word position j for i indexing over sentences in $D_l \cup D_u$.

Token-to-Type Mapping

The similarity graph is defined over types while the posteriors computed above involve particular tokens. In some implementations, token-based marginals are accumulated to create type marginals as follows. In the previous section, the set of trigram types with the set V of graph vertices were identified. For a sentence i and word position j in that sentence, let T(i, j) be the n-gram (graph node) with middle word at position j; conversely, for a n-gram u, let $T^I(u)$ be the set of occurrences of type u, that is, all pairs (i, j) where i is the index of a sentence where u occurs and j is the position of the center word of an occurrence of u in that sentence. The type-level posteriors can be calculated follows:

$$q_u(y) \triangleq \frac{1}{|T^{-1}(u)|} \sum_{(i,j) \in T^{-1}(u)} p(y_i^{(j)} | x_i; \Lambda_n^{(t)}).$$

The above combination rule connects the token-centered world of the CRF to type-centered world of the graph. Other ways of combining the token marginals, such as using weights derived from the entropies of marginals, are possible.

Graph Propagation

In various implementations, the graph whose construction was detailed in above is now used to smooth type-level marginals by minimizing the following convex objective:

$$c(q) = \sum_{u \in V_l} \|r_u - q_u\|^2 + \mu \sum_{u \in V, v \in N(i)} w_{uv} \|q_u - q_v\|^2 + \qquad (3)$$

$$v \sum_{u \in V} \|q_u - U\|^2 s.t. \sum_y q_u(y) = 1 \forall u \ \& \ q_u(y) \geq 0 \forall u, y$$

where $q = \{q_1, q_2, \ldots q_{|V|}\}$, $\mu$ and $v$ are hyper-parameters whose choice is discussed below, N(u) is the set of neighbors of node u, $\|q_u - q_v\|^2 = \sum_y (q_u(y) - q_v(y))^2$, $r_u$ is the empirical marginal label distribution for trigram u in the labeled data, and U is the uniform distribution over the possible labels Y. It can be shown that the above objective is convex in q.

The graph propagation objective can be seen as a multi-class generalization of the quadratic cost criterion. See Y. Bengio, O. Delalleau, and N. L. Roux, SEMI-SUPERVISED LEARNING, chapter LABEL PROPOGATION AND QUADRATIC CRITERION, MIT Press (2007), which is included by reference in its entirety. The first term in the above objective requires that the information in the labeled data be respected. The second term is the graph smoothness regularizer which requires that the $q_i$'s be smooth with respect to the graph. In other words, if $w_{uv}$ is large, then $q_u$ and $q_v$ should be close in the squared-error sense. This implies that vertices u and v are likely to have similar marginals over POS tags. The last term is a regularizer and encourages all type marginals to be uniform (if not preferred to the contrary by the first two terms). Thus if an unlabeled vertex does not have a path to any labeled vertex, this term ensures that the converged marginal for this vertex can be uniform over all tags. This term can plays an important role in ensuring that various implementations perform at least as well as standard self-training based algorithms.

While the objective in equation (3) admits a closed form solution, it involves inverting a matrix of order |V| and thus we can use instead the simple iterative update given by $$q_u^{(m)}(y) = \frac{\gamma_u(y)}{\kappa_u} \text{where} \quad (4)$$

$$\gamma_u(y) = r_u(y)\delta(u \in V_l) + \sum_{v \in N(u)} w_{uv} q_v^{(m-1)}(y) + \nu U(y),$$

$$\kappa_u = \delta(u \in V_l) + \nu + \mu \sum_{v \in N(u)} w_{uv}$$

where m is the iteration index and δ is the indicator function that returns 1 in some implementations if and only if the condition is true. The iterative procedure starts with $q_u^{(0)}(y)= q_u(y)$ as given in the previous section. In our experiments we run ten iterations of the above algorithm, and we denote by the type marginals at completion by $q_u^*(y)$.

Viterbi Decoding

A combination of the type marginals obtained from the graph and the CRF can be used to tag the unlabeled data in some implementations. For each unlabeled sentence i and word position j in it, the following interpolated tag marginal can be calculated:

$$\hat{p}(y_i^{(j)} = y | x_i) = \alpha p(y_i^{(j)} = y | x_i; \Lambda_n^{(t)}) + (1-\alpha) q_{T(m,n)}^*(y) \quad (5)$$

where α is a mixing coefficient which reflects the relative confidence between the original posteriors from the CRF and the smoothed posteriors from the graph. How α can be set is described below.

Although the interpolated marginals summarize all the information obtained so far about the tag distribution at each position, if they are used alone to select a POS tagging for each unlabeled sentence, the first-order dependencies tag dependencies modeled by the CRF could be ignored. Therefore, in some implementations, a single POS tagging is selected for each unlabeled sentence by Viterbi decoding of the combined interpolated marginals and the CRF transition potentials. These 1-best transcripts are referred to as $y_i^*, i \in D_u$.

Re-Training the CRF

In various implementations, the target domain one-best transcriptions obtained above is used in conjunction with the source domain labeled data to train a CRF:

$$\Lambda_{n+1}^{(t)} = \quad (6)$$

$$\operatorname*{argmin}_{\Lambda \in \mathbb{R}^K} \left[ -\sum_{i=1}^{l} \log p(y_i | x_i; \Lambda_n^{(t)}) - \eta \sum_{i=l+1}^{l+u} \log p(y_i^* | x_i; \Lambda_n^{(t)}) + \gamma \|\Lambda\|^2 \right].$$

where η and γ are hyper-parameters whose setting is discussed below. It is important to note that every step of the algorithm is convex, although their combination clearly is not.

Figure 5:
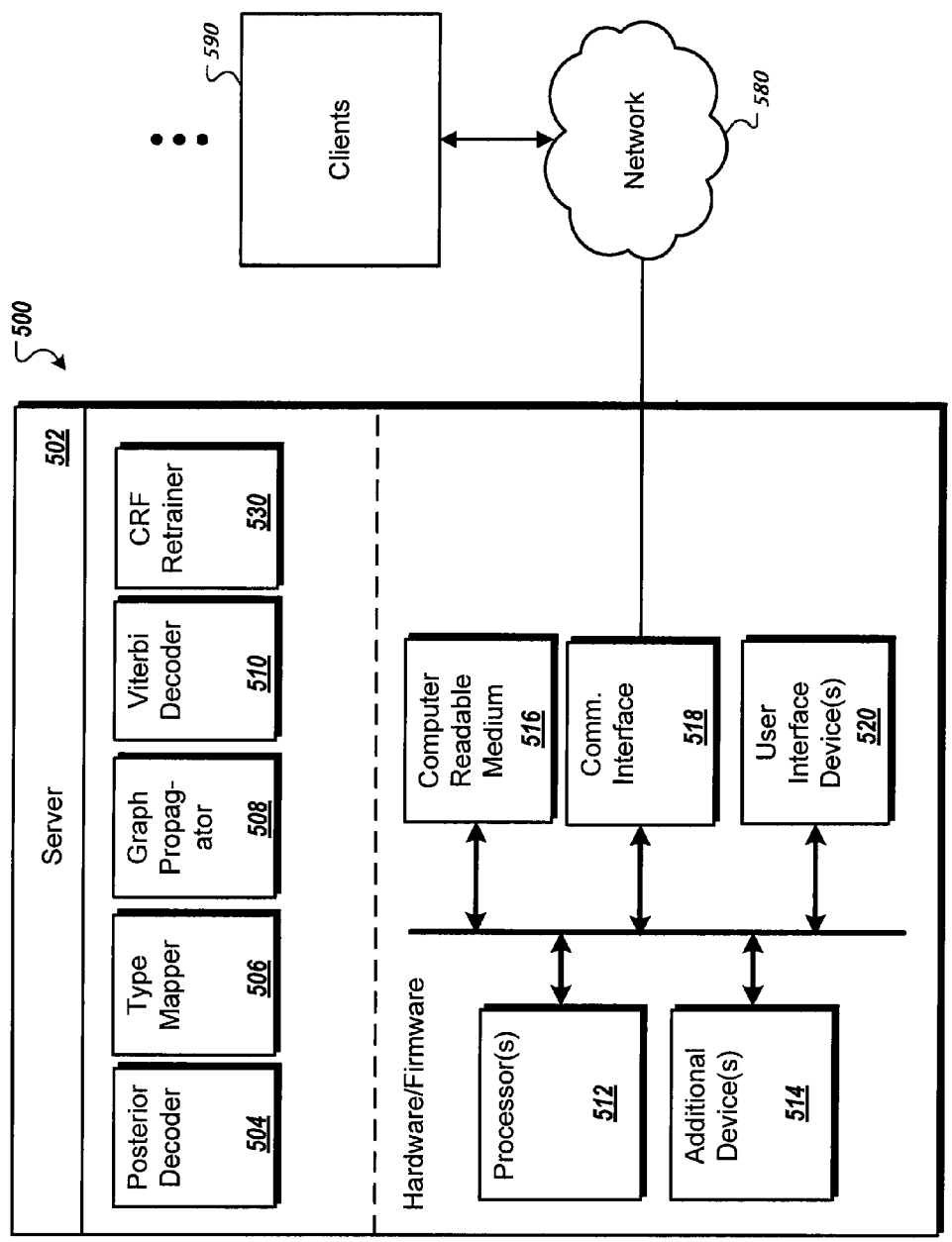
FIG. 5 is a schematic diagram of an example system configured to build a part-of-speech tagger.

FIG. 5 is a schematic diagram of an example system 500 configured to build a part-of-speech tagger. The system 500 generally consists of a server 502. The server 502 is optionally connected to one or more user or client computers 590 through a network 580 (e.g., the Internet). The server 502 consists of one or more data processing apparatuses. While only one data processing apparatus is shown, multiple data processing apparatuses can be used in one or more locations. The server 502 includes various modules, e.g., executable software programs, including a posterior decoder 504 configured to computer marginal probabilities over POS tags, a type mapper 506 configured to map tokens in a CRF to types in a graph, a graph propagator 508 configured to smooth type-level marginals, a Viterbi decoder 510 configured to tag unlabeled data using type marginals obtained from the graph and the CRF, and a CRF retrainer 530 configured to train a CRF using target domain 1-best transcriptions.

Each module runs as part of the operating system on the server 502, runs as an application on the server 502, or runs as part of the operating system and part of an application on the server 502, for instance. Although several software modules are illustrated, there may be fewer or more software modules. Moreover, the software modules can be distributed on one or more data processing apparatus connected by one or more networks or other suitable communication mediums.

The server 502 also includes hardware or firmware devices including one or more processors 512, one or more additional devices 514, a computer readable medium 516, a communication interface 518, and one or more user interface devices 520. Each processor 512 is capable of processing instructions for execution within the server 502. In some implementations, the processor 512 is a single or multi-threaded processor. Each processor 512 is capable of processing instructions stored on the computer readable medium 516 or on a storage device such as one of the additional devices 514. The server 502 can use its communication interface 518 to communicate with one or more computers 590, for example, over a network 580. Examples of user interface devices 520 include a display, a camera, a speaker, a microphone, a tactile feedback device, a keyboard, and a mouse. The server 502 can store instructions that implement operations associated with the modules described above, for example, on the computer readable medium 516 or one or more additional devices 514, for example, one or more of a floppy disk device, a hard disk device, an optical disk device, or a tape device.

Figure 6:
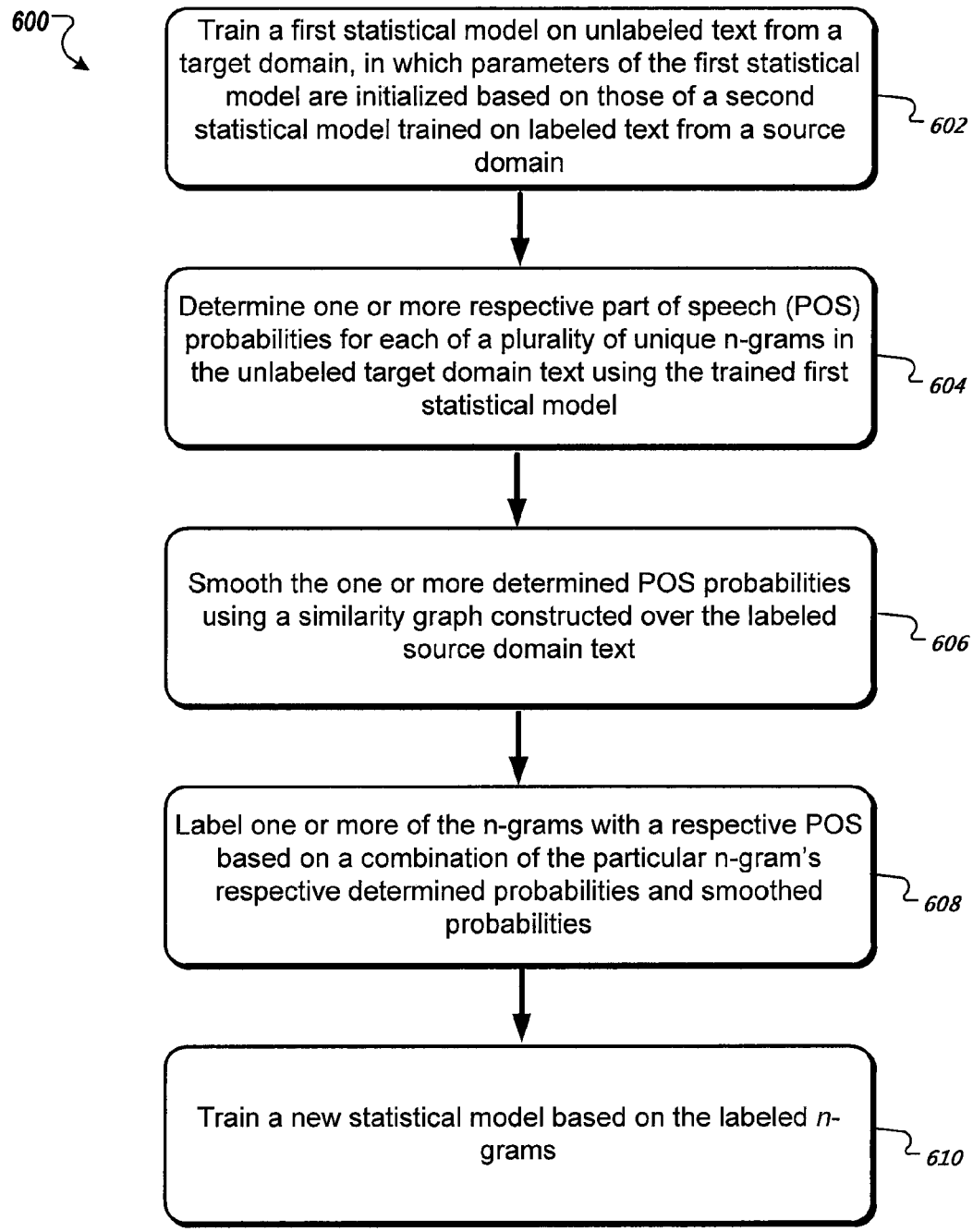
FIG. 6 presents a flow chart of an example semi-supervised learning algorithm for tagging-specific problems.

FIG. 6 presents a flow chart of an example semi-supervised learning algorithm for tagging-specific problems. A semi-supervised statistical model (e.g., a CRF) is trained on unlabeled text from a target domain (e.g., by the posterior decoder 504), in which parameters of the semi-supervised statistical model are initialized based on those of a second statistical model (e.g., another CRF) trained on labeled text from a source domain (602). One or more respective part-of-speech (POS) probabilities for each of a plurality of unique n-grams in the unlabeled target domain text are then determined (e.g., by the type mapper 506) using the trained semi-supervised statistical model (604). The one or more determined POS probabilities are smoothed (e.g., by the graph propagator) using a similarity graph constructed over the labeled source domain text (606). One or more of the n-grams are labeled with a respective POS based on a combination of the particular n-gram's respective determined probabilities and smoothed probabilities (608; e.g., by the Viterbi decoder 510). A new statistical model (e.g., a CRF) can then be trained on the labeled n-grams.

Experiments and Results

We use the Wall Street Journal (WSJ) section of the University of Pennsylvania Treebank as our labeled source domain training set. We follow standard setup procedures for this task and train on sections 00-18, comprising of 38,219 POS-tagged sentences with a total of 912,344 words. To evaluate our domain-adaptation approach, we consider two different target domains: questions and biomedical data. Both target domains are relatively far from the source domain (newswire), making this a very challenging task.

The QuestionBank (see J. Judge, A. Cahill, and J. van Genabith, QUESTION-BANK: CREATING A CORPUS OF PARSE-ANNOTATED QUESTIONS, In Proceedings of the 21st International Conference on Computational Linguistics and 44th Annual Meeting of the Association for Computational Linguistics, pages 497-504 (2006)), provides an excellent corpus consisting of 4,000 questions that were manually annotated with POS tags and parse trees. We used the first half as our development set and the second half as our test set. Questions are difficult to tag with WSJ-trained taggers primarily because the word order is very different than that of the mostly declarative sentences in the training data. Additionally, the unknown word rate is more than twice as high as on the in-domain development set (7.29% vs. 3.39%). As our unlabeled data, we use a set of 10 million questions collected from anonymized Internet search queries. These queries were selected to be similar in style and length to the questions in the QuestionBank. As running the CRF over 10 million sentences can be rather cumbersome, we randomly select 100,000 of these queries and treat this as $D_u$. For graph construction, we estimate the mutual information-based features for each trigram type over all the 10 million questions, but construct the graph over only the set of trigram types that occur in the 100,000 random subset and the WSJ training set.

For our second target domain we use the BioTreebank. This corpus consists of 1,061 sentences that have been manually annotated with POS tags. We used the first 500 sentences as a development set and the remaining 561 sentences as our final test set. The high unknown word rate (23.27%) makes this corpus very difficult to tag. Furthermore, the POS tag set for this data is a super-set of the Penn Treebank's, including the two new tags HYPH (for hyphens) and AFX (for common post-modifiers of biomedical entities such as genes). These tags were introduced due to the importance of hyphenated entities in biomedical text, and are used for 1.8% of the words in the test set. Any tagger trained only on WSJ text will automatically predict wrong tags for those words. For unlabeled data we used 100,000 sentences that were chosen by searching MEDLINE for abstracts pertaining to cancer, in particular genomic variations and mutations (Blitzer et al., 2006). In this case since we did not have access to additional unlabeled data, we used the same set of sentences as target domain unlabeled data, Du. Thus the graph here was constructed over the 100,000 unlabeled sentences and the WSJ training set. Finally, note that we did not make use of any label information for graph construction in either corpus.

Our baseline supervised CRF is competitive with state-of-the-art discriminative POS taggers (Toutanova et al., 2003; Shen et al., 2007), achieving 97.17% on the WSJ development set (sections 19-21). We use a fairly standard set of features, including word identity, suffixes and prefixes and special character detectors (dashes, digits, etc.). We do not make use of observation-dependent transition features. Both supervised and semi-supervised models are regularized with an l2-norm regularizer with weight was set to 0.01.

In addition to the supervised baseline trained exclusively on the WSJ, we also consider a semi-supervised self-trained baseline ("Self-trained CRF" in TABLE 2 in FIG. 1B). In this approach, we first train a supervised CRF on the labeled data and then do semi-supervised training without label-propagation. Note that this is different than plain self-training because we have a step that aggregates the posteriors over tokens to posteriors over types. This aggregation step allows the same trigram appearing in different sentences to share information and works better in practice than direct self-training on the output of the supervised CRF.

The data set obtained concatenating the WSJ training set with the 10 million questions had about 20 million trigram types. Of these only about 1.1 million trigram types occurred in the WSJ training set, in the 100,000 sentence sub-sample, or in both. For the biomedical domain, the graph had about 2.2 million trigrams. For all our experiments we use the following trade-off parameter settings–graph propagation: $\mu$=0.5, $\nu$=0.01, Viterbi decoding mixing coefficient $\alpha$=0.6, CRF retraining: $\eta$=0.001, $\gamma$=0.01. These parameters were chosen based on development set performance. All CRF objectives were optimized using L-BFGS (Bertsekas, 2004).

TABLE 2 (FIG. 1B) shows the results for both domains. For the question corpus, we notice that the supervised CRF performs at only 85% on the development set. While it is almost impossible to improve in-domain tagging accuracy and tagging is therefore considered a solved problem by many, these results clearly show that the problem is far from solved. Self-training improves over the baseline by about 0.6% on the development set. However the gains from self-training are more modest (0.2%) on the evaluation (test) set. Our approach is able to provide a more solid improvement of about 3% over the supervised baseline and about 2% over the self-trained system on the question development set. Unlike self-training, on the question evaluation set, our approach provides about 3% improvement over the supervised baseline. For the biomedical data, while the performances of our approach and self-training are statistically indistinguishable on the development set, we see modest gains of about 0.5% on the evaluation set. On the same data, we see that our approach provides about 2.4% absolute improvement over the supervised baseline.

The results suggest that our proposed approach provides better gains over self-training in the case of the questions data than on the biomedical corpus. We hypothesize that this is a result of sparsity in the graph generated from the biomedical dataset. For the questions graph, the PMI statistics were estimated over 10 million sentences while in the case of the biomedical dataset, the same statistics were computed over just 100,000 sentences. We hypothesize that the lack of well-estimated features in the case of the biomedical dataset leads to a sparse graph. To verify the above hypothesis, we measured: (a) the percentage of trigrams that occur in the target domain (unlabeled) data that do not have any path to a trigram in the source domain data, (b) the average minimum path length between a trigram in the target data and a trigram in the source data (when such a path exists). The results are shown in TABLE 3 (FIG. 1C). It can be seen that in the case of the biomedical data close to 50% of the trigrams from the target data do not have a path to a trigram from the source data. Even when such a path exists, the average path length is about 22. On the other-hand in the case of the questions corpus, only about 12% of the target domain trigrams are disconnected while the average path length is about 9. These results clearly show the sparse nature of the biomedical graph. We believe that it is this sparsity that causes the graph propagation to not have a more noticeable effect on the final inference. It is noteworthy that making use of even such a sparse graph does not lead to any degradation in results. We believe this is due to the regularizer used during graph propagation.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    creating a graph having a plurality of unique vertices in which vertices in a first set of vertices represent n-grams that are each associated with a respective part-of-speech (POS) and that were derived from labeled source domain text, and in which vertices in a different second set of vertices represent n-grams that are not associated with a POS and that were derived from unlabeled target domain text;
    for different pairs of vertices in the plurality of vertices in which at least one vertex in the pair is in the second set of vertices, and at least one vertex in the pair is a k-nearest neighbor of the other vertex in the pair where k is greater than 1, determining respective features of each vertex in the pair based at least partially on features of words that surround occurrences of the particular vertex's n-gram in the source or target domain text;
    calculating a respective measure of similarity between the vertices in each of the pairs based at least partially on a distance between the respective features of the pair, and using the measure of similarity to weight a graph edge between the pair;
    determining one or more respective POS probabilities for each of a plurality of unique n-grams in the unlabeled target domain text using a semi-supervised statistical model trained on unlabeled text from a target domain;
    smoothing the one or more determined POS probabilities using the graph, wherein smoothing the one or more determined POS probabilities for a respective n-gram is based on an edge weight between a first vertex in the similarity graph that represents the respective n-gram and a different, second vertex in the similarity graph that represents a different n-gram that is associated with a POS; and
    labeling one or more of the n-grams with a respective POS based on a combination of the particular n-gram's respective determined probabilities and smoothed probabilities.

2. The method of claim 1 in which the respective features of the pair are represented by point-wise mutual information vectors.

3. The method of claim 2 in which the respective measure of similarity is a cosine distance between the vectors.

4. The method of claim 2 in which the respective features include left and right word contexts.

5. The method of claim 1, further comprising using the similarity graph to decode target domain text.

6. The method of claim 1, further comprising propagating a POS associated with a first vertex in the graph to a second vertex in the graph based on a weight of an edge between the first vertex and the second vertex.

7. A computer-implemented method, comprising:
    creating a graph having a plurality of unique vertices in which the vertices represent n-grams that were derived from unlabeled source domain text in a first natural language;
    for different pairs of vertices in the plurality of vertices in which at least one vertex in the pair is a k-nearest neighbor of the other vertex in the pair where k is greater than 1, determining respective features of each vertex in the pair based at least partially on features of words that surround occurrences of the particular vertex's n-gram in the source domain text;
    calculating a respective measure of similarity between the vertices in each of the pairs based at least partially on a distance between the respective features of the pair, and using the measure of similarity to weight a graph edge between the pair;
    assigning a respective part-of-speech (POS) to one or more vertices in a plurality of the graph vertices in which the respective POS corresponds to a POS of a respective n-gram in a target domain text that is in a different second natural language, in which assigning the respective part-of-speech to the one or more vertices comprises determining that the respective n-gram in the target domain text is similar to the n-gram represented by the particular vertex based on co-occurrences of both n-grams in one or more natural languages;

propagating an assigned POS associated with a first vertex in the graph to a second vertex in the graph based on a weight of an edge between the first vertex and the second vertex;

determining one or more respective POS probabilities for each of a plurality of unique n-grams in the unlabeled target domain text using a semi-supervised statistical model trained on unlabeled text from a target domain;

smoothing the one or more determined POS probabilities using the graph, wherein smoothing the one or more determined POS probabilities for a respective n-gram is based on an edge weight between a first vertex in the similarity graph that represents the respective n-gram and a different, second vertex in the similarity graph that represents a different n-gram that is associated with a POS; and labeling one or more of the n-grams with a respective POS based on a combination of the particular n-gram's respective determined probabilities and smoothed probabilities.

8. The method of claim 7 in which the respective features of the pair are represented by point-wise mutual information vectors.

9. The method of claim 8 in which the respective measure of similarity is a cosine distance between the vectors.

10. The method of claim 8 in which the respective features include left and right word contexts.

11. The method of claim 7, further comprising using the graph to decode unlabeled data from the source domain text.

12. A computer-implemented method, comprising:

training a semi-supervised statistical model on unlabeled text from a target domain, in which parameters of the semi-supervised statistical model are initialized based on those of a second statistical model trained on labeled text from a source domain;

determining one or more respective part-of-speech (POS) probabilities for each of a plurality of unique n-grams in the unlabeled target domain text using the trained semi-supervised statistical model;

smoothing the one or more determined POS probabilities using a similarity graph constructed over the labeled source domain text, wherein smoothing the one or more determined POS probabilities for a respective n-gram is based on an edge weight between a first vertex in the similarity graph that represents the respective n-gram and a different, second vertex in the similarity graph that represents a different n-gram that is associated with a POS; and labeling one or more of the n-grams with a respective POS based on a combination of the particular n-gram's respective determined probabilities and smoothed probabilities.

13. The method of claim 12, further comprising training a third statistical model based on the labeled n-grams.

14. The method of claim 13 in which the semi-supervised, second and third statistical models are conditional random fields.

15. The method of claim 12 in which the source domain is English language newswire and the target domain is one of: (i) biomedical literature, (ii) user queries, and (iii) newswire from a non-English natural language.

16. A system comprising:

a storage medium including instructions;

a data processing apparatus coupled to the storage medium and able to execute the instructions to perform operations comprising:

creating a graph having a plurality of unique vertices in which vertices in a first set of vertices represent n-grams that are each associated with a respective part-of-speech (POS) and that were derived from labeled source domain text, and in which vertices in a different second set of vertices represent n-grams that are not associated with a POS and that were derived from unlabeled target domain text;

for different pairs of vertices in the plurality of vertices in which at least one vertex in the pair is in the second set of vertices, and at least one vertex in the pair is a k-nearest neighbor of the other vertex in the pair where k is greater than 1, determining respective features of each vertex in the pair based at least partially on features of words that surround occurrences of the particular vertex's n-gram in the source or target domain text;

calculating a respective measure of similarity between the vertices in each of the pairs based at least partially on a distance between the respective features of the pair, and using the measure of similarity to weight a graph edge between the pair;

determining one or more respective POS probabilities for each of a plurality of unique n-grams in the unlabeled target domain text using a semi-supervised statistical model trained on unlabeled text from a target domain;

smoothing the one or more determined POS probabilities using the graph, wherein smoothing the one or more determined POS probabilities for a respective n-gram is based on an edge weight between a first vertex in the similarity graph that represents the respective n-gram and a different, second vertex in the similarity graph that represents a different n-gram that is associated with a POS; and labeling one or more of the n-grams with a respective POS based on a combination of the particular n-gram's respective determined probabilities and smoothed probabilities.

17. A storage medium encoded with a computer program, the program comprising instructions that when executed by data processing apparatus cause the data processing apparatus to perform operations comprising:

creating a graph having a plurality of unique vertices in which vertices in a first set of vertices represent n-grams that are each associated with a respective part-of-speech (POS) and that were derived from labeled source domain text, and in which vertices in a different second set of vertices represent n-grams that are not associated with a POS and that were derived from unlabeled target domain text;

for different pairs of vertices in the plurality of vertices in which at least one vertex in the pair is in the second set of vertices, and at least one vertex in the pair is a k-nearest neighbor of the other vertex in the pair where k is greater than 1, determining respective features of each vertex in the pair based at least partially on features of words that surround occurrences of the particular vertex's n-gram in the source or target domain text;

calculating a respective measure of similarity between the vertices in each of the pairs based at least partially on a distance between the respective features of the pair, and using the measure of similarity to weight a graph edge between the pair;

determining one or more respective POS probabilities for each of a plurality of unique n-grams in the unlabeled target domain text using a semi-supervised statistical model trained on unlabeled text from a target domain;

smoothing the one or more determined POS probabilities using the graph, wherein smoothing the one or more determined POS probabilities for a respective n-gram is based on an edge weight between a first vertex in the similarity graph that represents the respective n-gram and a different, second vertex in the similarity graph that represents a different n-gram that is associated with a POS; and labeling one or more of the n-grams with a respective POS based on a combination of the particular n-gram's respective determined probabilities and smoothed probabilities.

18. A system comprising:

a storage medium including instructions;

a data processing apparatus coupled to the storage medium and able to execute the instructions to perform operations comprising:

creating a graph having a plurality of unique vertices in which the vertices represent n-grams that were derived from unlabeled source domain text in a first natural language;

for different pairs of vertices in the plurality of vertices in which at least one vertex in the pair is a k-nearest neighbor of the other vertex in the pair where k is greater than 1, determining respective features of each vertex in the pair based at least partially on features of words that surround occurrences of the particular vertex's n-gram in the source domain text;

calculating a respective measure of similarity between the vertices in each of the pairs based at least partially on a distance between the respective features of the pair, and using the measure of similarity to weight a graph edge between the pair;

assigning a respective part-of-speech (POS) to one or more vertices in a plurality of the graph vertices in which the respective POS corresponds to a POS of a respective n-gram in a target domain text that is in a different second natural language, in which assigning the respective part-of-speech to the one or more vertices comprises determining that the respective n-gram in the target domain text is similar to the n-gram represented by the particular vertex based on co-occurrences of both n-grams in one or more natural languages;

propagating an assigned POS associated with a first vertex in the graph to a second vertex in the graph based on a weight of an edge between the first vertex and the second vertex;

determining one or more respective POS probabilities for each of a plurality of unique n-grams in the unlabeled target domain text using a semi-supervised statistical model trained on unlabeled text from a target domain;

smoothing the one or more determined POS probabilities using the graph, wherein smoothing the one or more determined POS probabilities for a respective n-gram is based on an edge weight between a first vertex in the similarity graph that represents the respective n-gram and a different, second vertex in the similarity graph that represents a different n-gram that is associated with a POS; and labeling one or more of the n-grams with a respective POS based on a combination of the particular n-gram's respective determined probabilities and smoothed probabilities.

19. A storage medium encoded with a computer program, the program comprising instructions that when executed by data processing apparatus cause the data processing apparatus to perform operations comprising:

creating a graph having a plurality of unique vertices in which the vertices represent n-grams that were derived from unlabeled source domain text in a first natural language;

for different pairs of vertices in the plurality of vertices in which at least one vertex in the pair is a k-nearest neighbor of the other vertex in the pair where k is greater than 1, determining respective features of each vertex in the pair based at least partially on features of words that surround occurrences of the particular vertex's n-gram in the source domain text;

calculating a respective measure of similarity between the vertices in each of the pairs based at least partially on a distance between the respective features of the pair, and using the measure of similarity to weight a graph edge between the pair;

assigning a respective part-of-speech (POS) to one or more vertices in a plurality of the graph vertices in which the respective POS corresponds to a POS of a respective n-gram in a target domain text that is in a different second natural language, in which assigning the respective part-of-speech to the one or more vertices comprises determining that the respective n-gram in the target domain text is similar to the n-gram represented by the particular vertex based on co-occurrences of both n-grams in one or more natural languages;

propagating an assigned POS associated with a first vertex in the graph to a second vertex in the graph based on a weight of an edge between the first vertex and the second vertex;

determining one or more respective POS probabilities for each of a plurality of unique n-grams in the unlabeled target domain text using a semi-supervised statistical model trained on unlabeled text from a target domain;

smoothing the one or more determined POS probabilities using the graph, wherein smoothing the one or more determined POS probabilities for a respective n-gram is based on an edge weight between a first vertex in the similarity graph that represents the respective n-gram and a different, second vertex in the similarity graph that represents a different n-gram that is associated with a POS; and labeling one or more of the n-grams with a respective POS based on a combination of the particular n-gram's respective determined probabilities and smoothed probabilities.

20. A system comprising:

a storage medium including instructions;

a data processing apparatus coupled to the storage medium and able to execute the instructions to perform operations comprising:

training a semi-supervised statistical model on unlabeled text from a target domain, in which parameters of the semi-supervised statistical model are initialized based on those of a second statistical model trained on labeled text from a source domain;

determining one or more respective part-of-speech (POS) probabilities for each of a plurality of unique n-grams in the unlabeled target domain text using the trained semi-supervised statistical model;

smoothing the one or more determined POS probabilities using a similarity graph constructed over the labeled source domain text, wherein smoothing the one or more determined POS probabilities for a respective n-gram is based on an edge weight between a first vertex in the similarity graph that represents the respective n-gram and a different, second vertex in the similarity graph that represents a different n-gram that is associated with a POS; and labeling one or more of the n-grams with a respective POS based on a combination of the particular n-gram's respective determined probabilities and smoothed probabilities.

21. A storage medium encoded with a computer program, the program comprising instructions that when executed by data processing apparatus cause the data processing apparatus to perform operations comprising:

training a semi-supervised statistical model on unlabeled text from a target domain, in which parameters of the semi-supervised statistical model are initialized based on those of a second statistical model trained on labeled text from a source domain;

determining one or more respective part-of-speech (POS) probabilities for each of a plurality of unique n-grams in the unlabeled target domain text using the trained semi-supervised statistical model;

smoothing the one or more determined POS probabilities using a similarity graph constructed over the labeled source domain text, wherein smoothing the one or more determined POS probabilities for a respective n-gram is based on an edge weight between a first vertex in the similarity graph that represents the respective n-gram and a different, second vertex in the similarity graph that represents a different n-gram that is associated with a POS; and labeling one or more of the n-grams with a respective POS based on a combination of the particular n-gram's respective determined probabilities and smoothed probabilities.

* * * * *